United States Patent Office 3,550,998
Patented Dec. 29, 1970

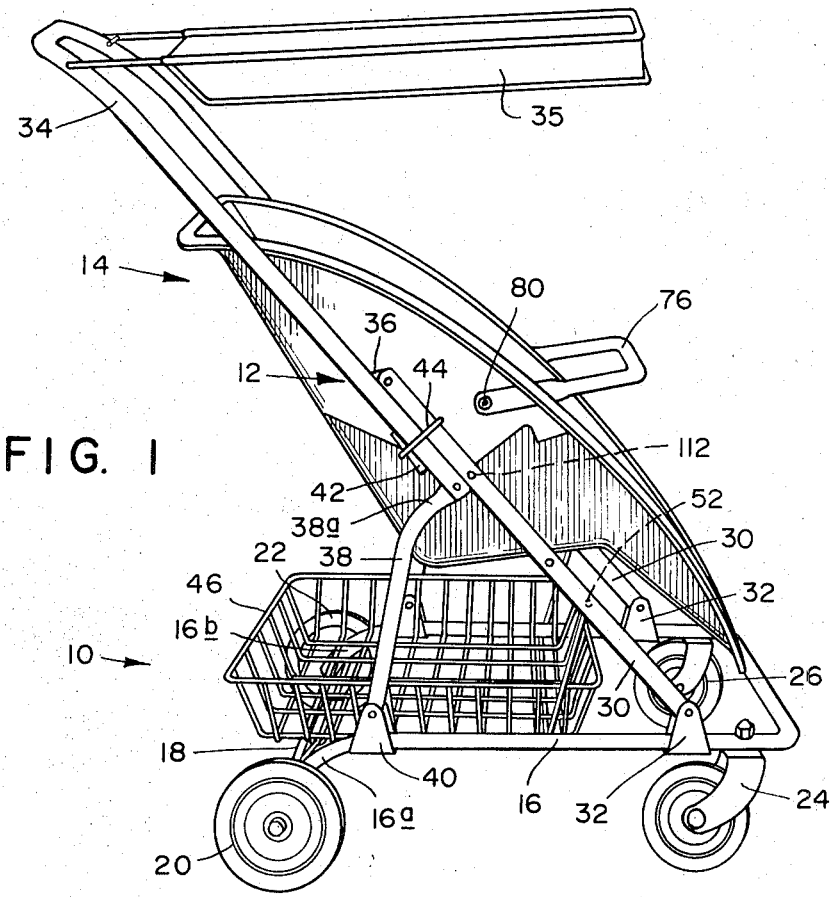
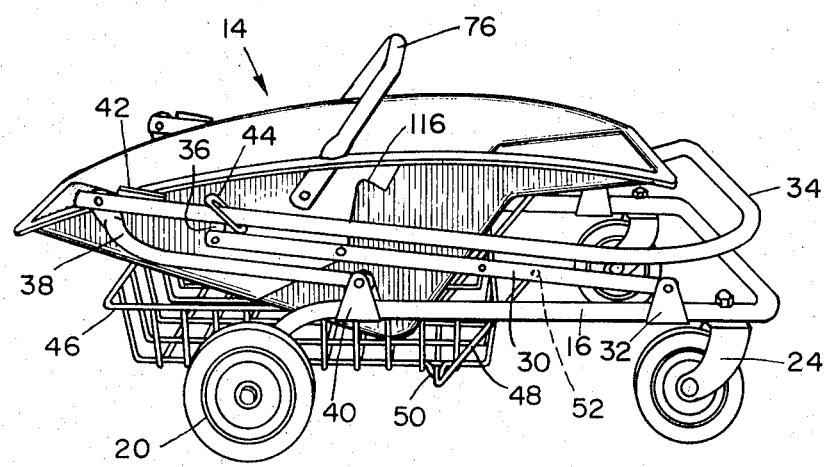

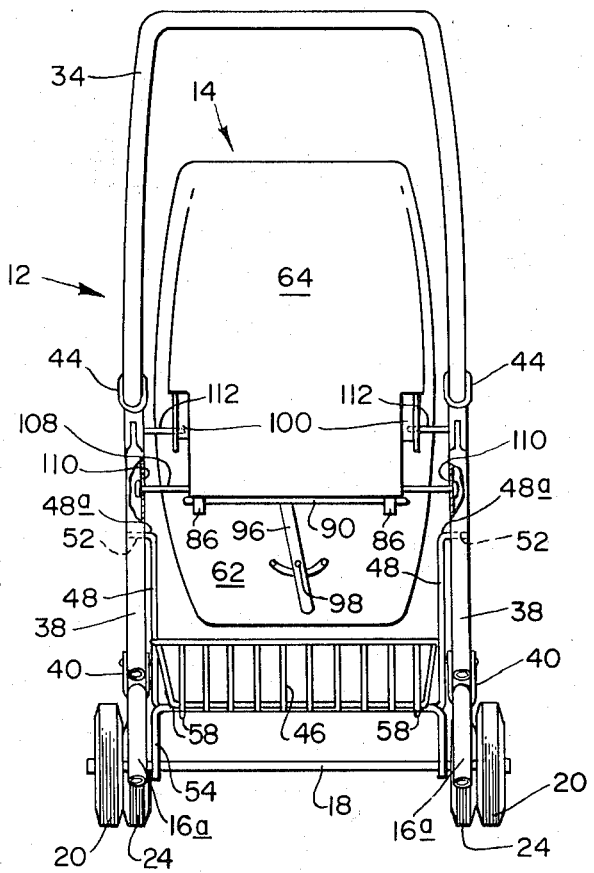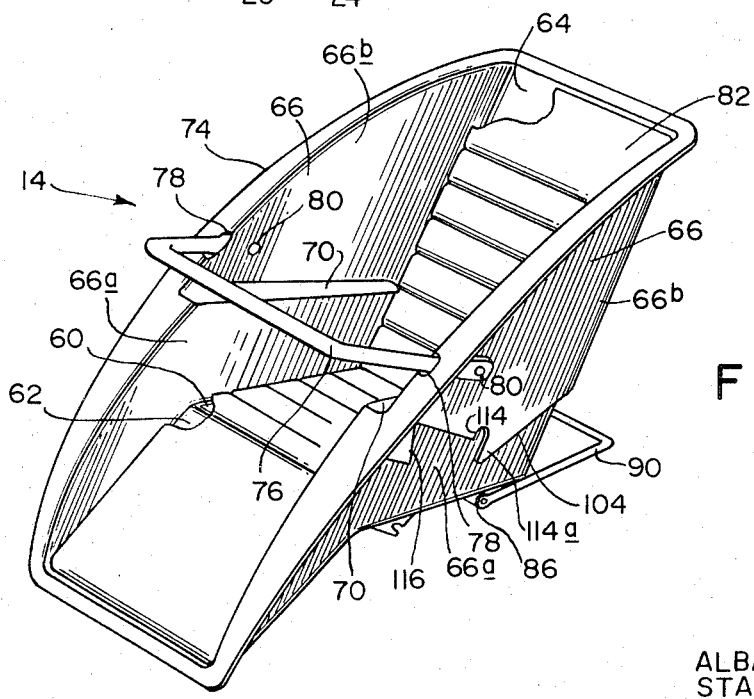

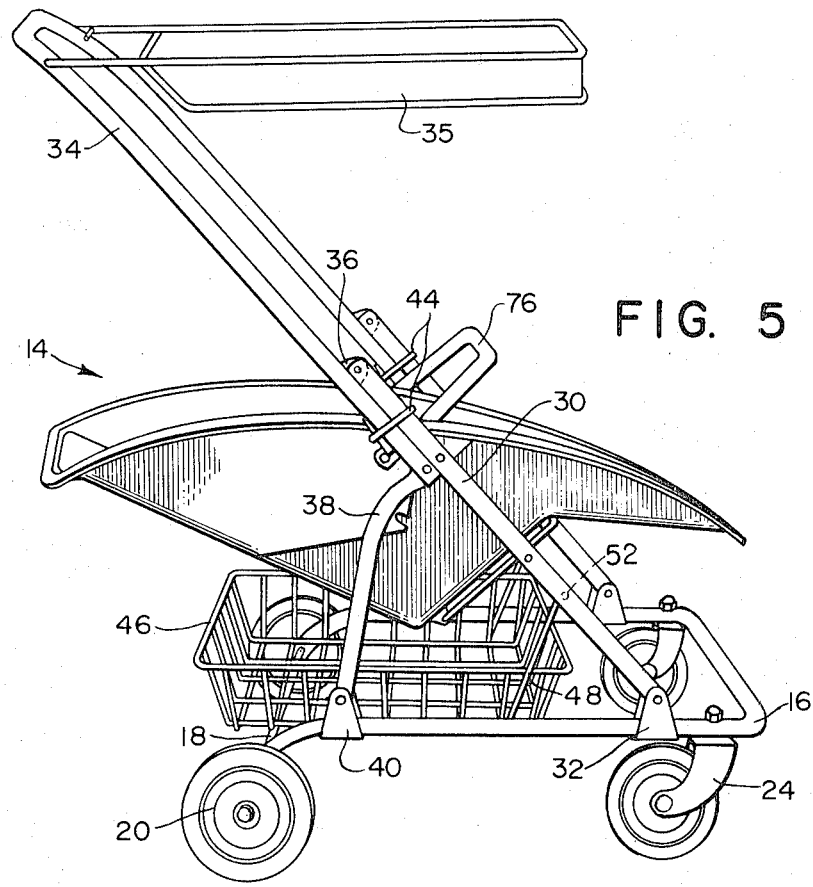
FIG. 5
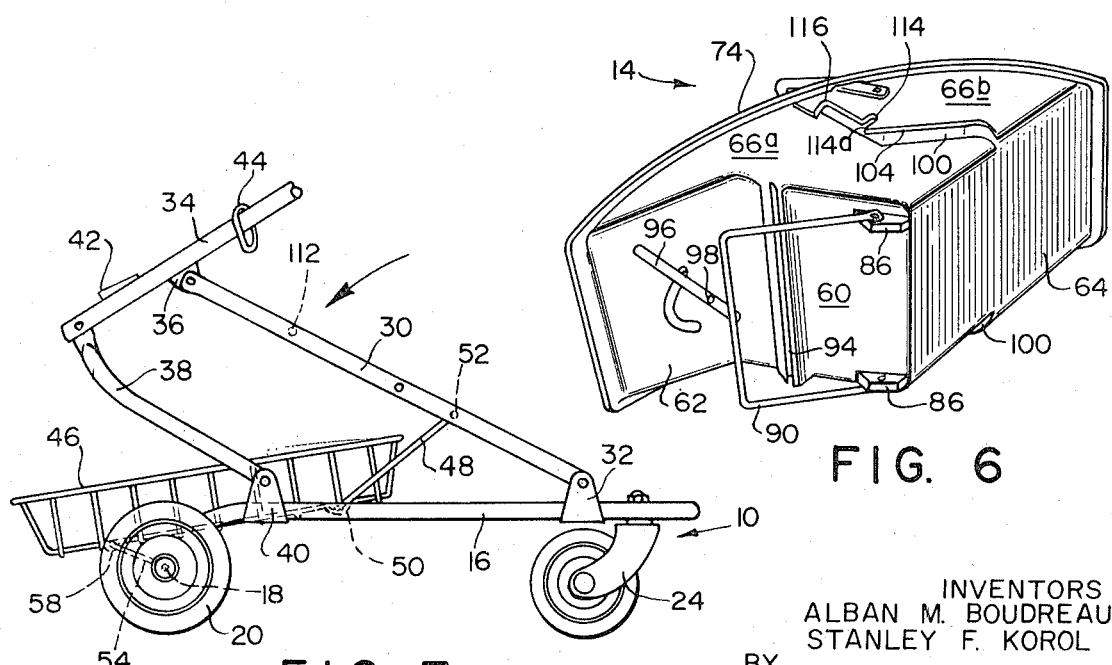
FIG. 6
FIG. 7
INVENTORS
ALBAN M. BOUDREAU
STANLEY F. KOROL
BY
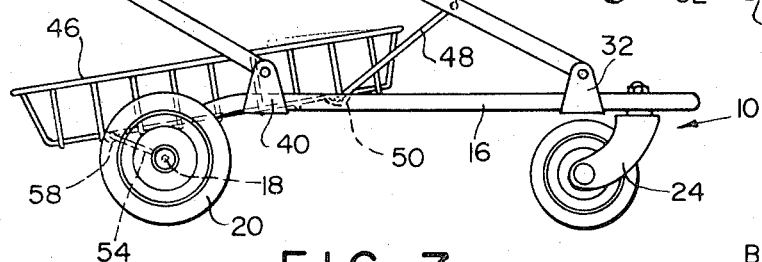
ATTORNEYS

3,550,998
FOLDABLE CARRIAGE AND INFANT SEAT COMBINATION
Alban M. Boudreau, Bedford, and Stanley F. Korol, Everett, Pa., assignors to Hedstrom Union Company, Bedford, Pa.
Filed Sept. 3, 1968, Ser. No. 757,054
Int. Cl. B62b 7/14
U.S. Cl. 280—31                                                       21 Claims

ABSTRACT OF THE DISCLOSURE

A foldable carriage comprises a wheeled running gear and a rigid body removably and adjustably mounted on the running gear. The body is adjustable from a generally horizontal carriage position to a generally upright stroller position. Also the rigid body can be removed from the gear and function independently as an infant seat. In addition, the body and running gear are arranged so that when the carriage is folded, the carriage components including the rigid body nest into a very compact package.

BACKGROUND OF THE INVENTION

Field of the invention

This invention relates to improved juvenile furniture. It relates more particularly to a juvenile furniture item which is able to function selectively as a baby carriage, a stroller or an infant seat and which also can be folded easily into a compact package.

Most juvenile furniture items now on the market have only one mode of operation; they can be used in only one way by a child. Therefore, those parents who have babies often have to obtain, store and carry about several separate juvenile furniture items for the same child. As a practical matter, full use is not made of any one of those items.

Also, present day foldable carriages and strollers particularly have not been designed with the infant's posture in mind. They usually have seats comprising flat, hinged-together boards surrounded by flexible fabric. This seat construction does not provide adequate support for the baby, particularly when he is sitting in the upright position. The baby tends to slouch forward or slump to the side because the carriage body does not hold him in the correct position or posture.

SUMMARY OF THE INVENTION

Accordingly, this invention aims to provide a juvenile furniture item which is capable of functioning as a carriage or a stroller and whose body may be used separately as an infant seat.

Another object of the invention is to provide a baby carriage having a postural body which maintains the child in the proper position within the carriage.

A still further object of the invention is to provide a convertible baby carriage and stroller having a rigid body and which can be folded into a compact package.

Another object of the invention is to provide an improved convertible baby carriage and stroller with a rigid body which protectively encloses the infant.

Other objects of the invention will in part be obvious and will in part appear hereinafter.

The invention accordingly comprises the features of construction, combination of elements and arrangement of parts which will be exemplified in the construction hereinafter set forth, and the scope of the invention will be indicated in the claims.

Briefly, the carriage comprises a wheeled running gear composed of a plurality of tubular members arranged to support a carriage body above the ground. The body itself is a single, rigid, molded unit which is specially contoured to maintain the baby in the correct posture or position. The rigid body is adjustably mounted on the running gear so that it can be oriented from a generally upright stroller position wherein the baby is maintained in a sitting posture, to a generally horizontal carriage position which supports the baby in a generally reclining posture. Special fixtures to be described in more detail later lock the rigid body to the running gear so that the body remains securely fixed in each of its adjustable positions.

Also in accordance with the invention, the rigid body may be removed from the gear and function separately as an infant seat. In this, the fixture used to lock the seat to the gear performs a dual function in that it also serves as a supporting base for the infant seat.

It is a further feature of the present invention that the carriage, including the seat, may be folded into a very compact package, despite the fact that the body is a relatively large, rigid, one-piece unit. That is, the elements of the running gear fold so as to nest the rigid body in the undercarriage so that the total unit occupies a relatively small volume.

In addition, all of the load bearing elements of the carriage are constructed of components which are substantially unaffected by heavy use. Therefore, the carriage as a whole has a relatively long, useful life as compared with prior comparable carriages having flexible plastic or fabric bodies.

BRIEF DESCRIPTION OF THE DRAWINGS

For a fuller understanding of the nature and objects of the invention, reference should be had to the following detailed description taken in connection with the accompanying drawings, in which:

FIG. 1 is a side perspective view of a carriage embodying the principles of this invention, with the carriage shown in its stroller position;

FIG. 2 is a rear view thereof;

FIG. 3 is a perspective view from the side showing the FIG. 1 carriage in its completely folded position;

FIG. 4 is a perspective view of the FIG. 1 carriage body separated from the running gear and functioning independently as an infant seat;

FIG. 5 is a side perspective view of the FIG. 1 carriage, showing the carriage body in its reclined carriage position;

FIG. 6 is a perspective view from the rear showing the separable carriage body; and FIG. 7 is a fragmentary side view showing a portion of the FIG. 1 carriage gear in a partially folded condition.

DESCRIPTION OF THE PREFERRED EMBODIMENT

Referring now to FIG. 1 of the drawings, the present carriage has a running gear comprising a wheeled undercarriage indicated generally at 10 and an upstanding frame assembly indicated generally at 12. A rigid, one-piece contoured body indicated generally at 14 is adjustably mounted on frame assembly 12 above undercarriage 10. Body 14 is adjustable from a generally upright stroller position shown in FIG. 1 to a generally horizontal carriage position shown in FIG. 5. In addition, body 14 is separable from frame structure 12 so that it can function independently as an infant seat as seen in FIG. 4. Moreover, frame assembly 12 is foldable, with it and rigid body 14 nesting down on undercarriage 10 so that the entire unit forms a relatively compact package occupying a relatively small space as seen in FIG. 3.

Still referring to FIG. 1, undercarriage 10 comprises a horizontally, generally U-shaped frame member 16 having downturned end portions 16a and 16b. An axle 18 extends through portions 16a and 16b and wheels 20 and 22 are mounted on opposite ends of axle 18. Also, a pair of relatively large casters 24 and 26 are pivotally mounted to the opposite sides of frame member 16 near the forward end thereof.

Frame assembly 12 is pivotally secured to frame member 16. Since the opposite sides of frame assembly 12 are identical, we will describe in detail only the elements at one side thereof, it being understood that the same numbers apply to corresponding elements on the opposite side of the carriage.

Frame assembly 12 comprises a pair of straight tubular frame members 30 pivotally connected to straps 32 engaging around frame member 16 just rearwardly of casters 24 and 26. The upper ends of members 30 are attached to the legs of a generally U-shaped pusher handle 34. More particularly, the upper ends of frame members 30 are pivotally connected to ears 36 protruding from the legs of handle 34 at points spaced appreciably above the ends of the pusher handle. A conventional canopy 35 is swingably mounted near the upper end of handle 34.

Frame assembly 12 also includes a second pair of frame members 38 whose lower ends are pivotally connected to straps 40 engaging around the legs of frame member 16 just forwardly of the turned-down portions 16a and 16b thereof. Frame members 38 have upper portions 38a which are bent forwardly and are pivotally connected to the ends of pusher handle 34. In this connection, each portion 38a intercepts the leg of pusher handle 34 at approximately a 90° angle. Thus as seen in FIG. 1, frame members 30, 38 and the leg of pusher handle 34 at each side of the vehicle are arranged in a generally inverted Y configuration.

Wedge plates 42 are secured to the undersides of the pusher handle 34 legs just above the pivotal connections to frame members 38. Also, a slip ring 44 encircles each leg of pusher handle 34 and the upper end of the associated frame member 30. Each ring 44 is adapted to slide down and wedge onto its corresponding plate 42 so as to tightly grip the arm of pusher handle 34 and its corresponding frame member 30, thereby holding them together in the position shown in FIG. 1 to lock the carriage in the correct position.

A generally rectangular wire basket 46 is suspended below body 14. More particularly, and referring especially to FIGS. 2 and 7, basket 46 is supported at its forward end by a generally U-shaped wire hanger 48 whose web or bridging portion is hingedly connected at 50 to the bottom of basket 46 near the forward end thereof. Hanger 48 has outwardly turned end portions 48a which hook into openings 52 in frame members 30, these openings being located an appreciable distance up from the lower ends of members 30. The rear end of basket 46 is supported by another generally U-shaped wire hanger 54 whose web or bridging portion is hingedly mounted at 58 to the bottom of basket 46 near the rear end thereof. The ends of hanger 54 extend down from basket 46 and swingably encircle axle 18 inwardly of frame member portions 16a, as best seen in FIG. 2.

Referring now particularly to FIGS. 4 and 6, body 14 comprises a one-piece rigid unit constructed of fiberglass, rigid plastic or other comparable material. Body 14 is especially contoured to provide maximum support for the infant, be he in a sitting position as he would be in FIG. 1 or a reclining position as he would be in FIG. 5.

More particularly, body 14 is contoured so that it has a generally horizontal seat portion 60, a downwardly-forwardly inclining leg support portion 62 integral with the front edge of portion 60 and an upwardly-rearwardly inclining back suport portion 64 integral with the rear edge of portion 60. Body 14 also has opposite sidewalls 66 integral with portions 60, 62 and 64 which extend in an arcuate manner from the top of portion 64 to the bottom of portion 62. Sidewalls 66 extend forwardly a considerable distance from the juncture of seat portions 60 and 64 so that the sidewalls protectively enclose the infant and contain him in an erect position in the seat.

Sidewalls 66 are formed with inside steps 70, spaced appreciably above and parallel to seat portion 60. The portions 66a of sidewalls 66 located below steps 70 are closer together than the wall portions 66b situated above steps 70. Thus, the occupant's hips, legs and lower back are relatively snugly contained within carriage body 14 so that the baby is snugly supported in an erect position. On the other hand, the wall portions 66b above steps 70 are further apart to allow more room for movement of the baby's arms and upper torso. Body 14 also has a continuous flange 74 extending all around its edge to present a smoothly rounded surface at the front of body 14.

As best seen in FIG. 4, the legs of a generally U-shaped tubular handle 76 extend through openings 78 in flange 74 at opposite sides of body 14 above steps 70 and are secured by rivets 80 to sidewall portions 66b. Handle 76 is thus locked in the position shown in FIG. 4 and serves as a retainer to prevent the baby from falling out or sliding out of the front of body 14. Handle 76 also functions as a carrying handle by which the parent may lift the body 14 and its occupant. The inclination of handle 76 is arranged so that when body 14 is lifted, the weight distribution of body 14 and the baby therein cause the body to assume a generally horizontal position as shown in FIG. 5. Thus, there is no danger of the baby sliding out either the top or the bottom of body 14 when he is carried in this manner.

A pad 82 (FIG. 4) covering body portions 60, 62 and 64, is usually included for the baby's comfort.

Referring now to FIGS. 4 and 6, body 14 has a pair of relatively short feet 86 secured to the underside of body portion 60 at each side thereof. Also, a generally U-shaped bail 90 has its ends pivotally connected to feet 86. Bail 90 is able to swing from a closed position wherein it lies adjacent to body portion 60 as seen in FIG. 5 to an open position wherein it extends out behind the back of body 14 as shown in FIG. 4. The engagement of legs of the bail against the underside of body portion 60 in the open position prevents the bail from swinging up above the bottom of the seat.

When bail 90 is in its open position, body 14 may be placed with its feet 86 on the ground and stand upright as seen in FIG. 4. When a baby is placed in body 14, bail 90 prevents the unit from tipping over backwards due to the baby's movements. Thus, in this position, body 14 functions as a conventional infant's chair in which the parent can feed the child or otherwise tend to him. Also, as mentioned previously, the parent may safely carry the infant about in body 14.

Referring again to FIG. 6, a transverse groove or channel 94 is formed in the underside of body portion 60. Channel 94 is spaced back somewhat from the junction of body portions 60 and 62. Also, the channel is angled back slightly toward the rear of body 14. Bail 90 is arranged and adapted to engage over channel 94 when it is in its closed position as shown in FIG. 5. Bail 90 and channel 94 are used to mount body 14 on frame assembly 12 as will be described in detail later. A latch member 96 is pivotally connected at 98 to the underside of body portion 62. Latch member 96 can be swiveled about its pivot at 98 to engage over and retain bail 90 when it is in its closed position shown in FIG. 5.

Still referring to FIG. 6, the sidewalls 66 of body 14 are formed with a pair of outwardly extending shoulders 100 caused, in part, by the aforesaid formation of steps 70. Each shoulder 100 has a depending skirt 104. The exposed edge of each skirt is shaped to lock body 14 in its various adjustable positions when it is mounted on frame assembly 12 (FIGS. 1 and 5) as will be described in detail shortly.

Referring to FIGS. 2 and 6, body 14 is supported on frame assembly 12 by a transverse rod 108 whose ends extend into slots 110 in frame members 38 at opposite sides of the vehicle. More particularly, body 14 is positioned on rod 108 so that the rod is received in channel 94 (FIG. 6). Then bail 90 is swung to its closed position so that it engages under rod 108 and is locked in that position by latch member 96. Now body 14 is affixed to rod 108 and yet is free to tilt or turn on it. Slots 110 in frame members 38 are elongated in the direction parallel to the axis of these members so that the body has some vertical play within frame assembly 12 for reasons that will be described presently.

Body 14 is prevented from tilting about rod 108 by a pair of short stubs 112 secured on end to frame members 30 and projecting inward so as to engage under skirts 104.

As mentioned previously, skirts 104 are shaped to lock body 14 in its two adjustable positions. More particularly, and referring to FIG. 6, each skirt 104 has a generally vertical notch 114 midway along its length When body 14 is in its upright stroller position as shown in FIGS. 1 and 2, stubs 112 engage in notches 114 to lock the body in this position. The slots 110 in frame members 38 allow body 14 to move vertically slightly within frame assembly 12 so that stubs 112 can settle securely into notches 114. A depending nose 114a at the rear of each notch 114 always extends below its stub 112 so that body 14 cannot tip over forwardly beyond the FIG. 1 position.

Each skirt 104 has a second notch 116 located forwardly and upwardly from the corresponding notch 114 to lock body 14 in the horizontal carriage position illustrated in FIG. 5. When the parent wishes to adjust body 14 from the FIG. 1 stroller position to the FIG. 5 carriage position, she lifts up slightly on body 14. This disengages stubs 112 from notches 114 so that the body can be tilted back about rod 108 until stubs 112 engage notches 116. As best seen in FIG. 5, the weight of the infant in the carriage is such as to produce a counterclockwise torque on the body so that it has no tendency to shift by itself to the vertical position despite vigorous movements of the baby.

The parent can remove body 14 from frame assembly 12 at any time simply by swiveling latch member 96 out of engagement with bail 90, whereby the body can be lifted off rod 108 and stubs 112. This feature is very useful because now the parent can wheel the baby partway to her destination and then carry him the rest of the way. Thus, if the baby is sleeping in the carriage, the mother need not wake the baby in order to bring him into the house. Also, of course, the body 14 can serve separately as an infant seat in which the baby may feed or play, all the while being suported in the correct posture.

It is a further feature of this invention that the entire carriage, including the rigid body, may be folded or collapsed from the upright position shown in FIGS. 1 and 5 to a compact position as shown in FIG. 3. The folding operation is best illustrated in FIG. 7. Slip rings 44 are slid up on the legs of pusher handle 34, allowing the pusher handle to be moved forwardly. This, in turn, pivots frame members 30 and 38 toward the rear of the vehicle as indicated by the arrow in FIG. 7. As frame members 30 move down toward undercarriage 10, basket 46 is caused to drop down between the arms of frame member 16 in undercarriage 10 to allow room for the body 14.

More particularly, when frame assembly 12 is upright, basket 46 is supported above axle 18 by hanger 58. The front end of the basket is, in turn, suspended from frame members 30 by hanger 48. As frame member 30 approaches undercarriage 10, basket 46 is tilted upwards somewhat as shown in FIG. 7 and swung backwards until the bottom of basket 46 actually sits back on axle 18. Then, continued movement of frame members 30 in the direction indicated by the arrow in FIG. 7 lowers the front of basket 46 so that it drops down and is suspended between the legs of frame member 16 as best seen in FIG. 3. Body 14 can now drop down into basket 46. Canopy 35 (FIG. 1) may be swung backwards over pusher handle 34 so that it overlies the carriage body. Alternatively, it may be removed from the handle as shown.

It will be appreciated from the foregoing then that this vehicle can function selectively as a carriage, or a stroller or the carriage body may be used separately as an infant's seat. The body itself supports the child's back and head so that the child assumes the correct posture in the carriage body. Moreover, the rigid, one-piece body enveloping the child protects him from impacts or blows that would normally penetate a comparable carriage with a fabric body. Still further, the components of the present carriage are strong, sturdy and resistant to impacts, wear and weather. Therefore, the carriage as a whole has a long, useful life. Finally, despite the fact that the carriage employs a rigid, one-piece body and has a basket in which the parent can keep her purse or packages, the entire unit can be folded or collapsed very quickly and easily into a small, compact package for shipment or storage. This feature not only reduces the initial shipping cost of the manufacture; it also is an extremely desirable feature in today's market where purchasers are looking for juvenile furniture items which may be stored in relatively small storage areas and which may be carried about in a car without taking up too much space.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

We claim:
1. An improved baby carriage comprising
 (A) a wheeled undercarriage,
 (B) a frame assembly supported by said undercarriage, said assembly including
  (1) upstanding side frame members, and
  (2) a pusher handle connected to said side frame members,
 (C) a rigid contoured body pivotally connected to said frame assembly, said body having
  (1) a back portion,
  (2) a seat portion,
  (3) a leg supporting portion, and
  (4) side portions, all of said body portions being joined together to form a single unit,
 (D) means for adjustably locating said body at selected angular positions relative to said frame assembly, said seat portion being oriented
  (1) generally horizontally in one position of adjustment, and
  (2) upwardly in another position of adjustment, and
 (E) means for releasably securing said body to said frame assembly so that said body can be removed from said frame assembly and function separately as an infant seat, and
 (F) wherein said securing means comprises
  (1) a rod supported horizontally from said side frame members,
  (2) a receptacle on the underside of said seat portion for engaging over said rod, and
  (3) means for releasably holding said rod in said receptacle.

2. An improved carriage as defined in claim 1 wherein said body is formed as a one-piece molded structure contoured to contain a child.

3. An improved carriage as defined in claim 1 and further including a bail secured at the front of said body, said bail being arranged to
(A) prevent a child from falling out of said body, and
(B) function as a carrying handle for said body when that is being used as an infant seat.

4. An improved carriage as defined in claim 1 wherein said holding means comprise
(A) a U-shaped bail swingably mounted on the underside of said body, said bail being swingable between one position wherein it extends out behind said body to stabilize it when said body functions separately as an infant seat and a second position wherein it engages over said rod when that is in said receptacle, and
(B) a latch member on the underside of said body for locking said bail in its said second position, thereby securing said body to said frame assembly.

5. A baby carriage as defined in claim 1 and further including
(A) means for pivotally linking said handle and side frame members to said undercarriage, and
(B) means for releasably locking said frame assembly so that said handle and said side frame members can be folded down with said body nesting compactly within said undercarriage.

6. An improved carriage as defined in claim 5 and further including a basket pivotally supported from said frame assembly below said body, said basket being arranged to drop down into said undercarriage when said carriage is folded to provide nesting space for said body.

7. An improved carriage as defined in claim 6 wherein one end of said basket is pivotally supported by said undercarriage and the other end is pivotally suspended from said side frame members.

8. A juvenile furniture item comprising
(A) a wheeled running gear,
(B) an enclosure comprising a rigid one-piece molded structure having
    (1) a generally horizontal seat portion,
    (2) an upwardly inclining back portion,
    (3) a downwardly inclining leg supporting portion, and
    (4) a pair of rigid opposing side walls contiguous with all said enclosure portions,
(C) means for removably securing said enclosure to said running gear so that said enclosure can
    (1) be installed on said gear to function as a carriage body for protectively containing a child, and
    (2) be removed from said gear to function independently as an infant seat for supporting an infant incapable of sitting alone,
(D) a bail extending between the front edges of said side walls to retain an infant in said enclosure,
(E) a second bail swingably secured to the underside of said enclosure, said second bail being arranged to swing out behind said enclosure until it engages said back portion to provide a base extension for stabilizing the enclosure,
(F) a transverse groove,
    (1) formed in the underside of said enclosure within the swing of said second bail, and
    (2) arranged to receive a portion of said gear, and
(G) a latch member
    (1) swingably connected to the underside of said enclosure, and
    (2) arranged to lock said second bail adjacent the underside of said enclosure so that it engages over said groove to lock said gear portion in said said groove.

9. The juvenile item as defined in claim 8 wherein said securing means includes
(A) means for locking said enclosure in a first angular position relative to said gear wherein said seat portion is generally horizontal so that a child in said enclosure is supported in a generally upright sitting position, and
(B) means for locking said enclosure in a second angular position relative to said gear wherein said seat portion declines toward the rear of said enclosure so that a child in said enclosure is supported in a reclining position.

10. The juvenile item as defined in claim 8 and further including
(A) a bail extending between the front edges of said side walls to retain an infant in said enclosure, and
(B) a second bail swingably secured to the underside of said enclosure, said second bail being arranged to swing out behind said enclosure until it engages said back portion to provide a base extension for stabilizing said enclosure.

11. The juvenile item as defined in claim 8 and further including a bail secured to said enclosure so as to
(A) retain the child in said enclosure when said enclosure is secured to said running gear, and
(B) function as a carrying handle when said enclosure is separated from said gear.

12. The juvenile item as defined in claim 11 and further including a pad overlying said enclosure portions.

13. The juvenile item as defined in claim 8 wherein the bottom edges of said enclosure leg suporting and back portions are arranged so that when the enclosure is placed with these edges adjacent the ground, said seat portion is generally horizontal and the structure is self-supporting.

14. The juvenile item as defined in claim 13 wherein portions of said opposing side walls toward the top of said enclosure are spaced further apart than the remaining side wall portions so as to relatively snugly confine the hips and lower back of a child positioned in the enclosure while allowing relatively free movement of the child's arms and upper torso.

15. The juvenile item defined in claim 8 wherein said enclosure has
(A) a pair of depending skirts spaced outwardly from said side walls, and
(B) means defining notches in said skirts arranged to engage other portions of said gear.

16. The juvenile item defined in claim 15 wherein
(A) said gear portion includes a horizontal frame member engaging in said groove, and
(B) said other gear portions include a pair of projections for engaging in said notches, said enclosure being swingable about said frame member from a generally horizontal carriage position in which said projections engage in one set of said notches to a generally upright stroller position in which said projections engage in another set of said notches.

17. The juvenile item as defined in claim 8 wherein said running gear comprises
(A) a wheeled undercarriage,
(B) a pair of upstanding side frame assemblies, including a pusher handle, pivotally supported by said undercarriage, and
(C) means for releasing said frame assemblies so that they can be folded down toward said undercarriage until said rigid enclosure nests relatively compactly in said undercarriage.

18. The juvenile item as defined in claim 17 and further including a basket suspended by said frame assemblies below said enclosure and above said undercarriage, said basket being arranged to drop down below said undercarriage when said assemblies are folded so as to provide nesting space for said enclosure.

19. A juvenile item as defined in claim 17 wherein
(A) each said side frame assembly comprises (1) a first frame member having its lower end pivotally connected to said undercarriage and its upper end pivotally connected to said pusher handle, (2) a second frame member having its lower end pivotally connected to said undercarriage and its upper end pivotally connected to said pusher handle upwardly from the connection of said first frame member thereto, said first and second frame members at opposite sides of said item together with said pusher handle forming a pair of bell cranks which retain said side frame assemblies in an upstanding condition above said undercarriage and are releasable by swinging over said pusher handle so as to fold said assemblies down toward said undercarriage, and (3) a rod supported horizontally between said second frame members, (B) said securing means includes (1) means for pivotally connecting the underside of said enclosure to said rod, and (2) means for holding said enclosure at selected angular positions relative to said undercarriage.

20. A juvenile item as defined in claim 19 wherein said holding means comprise a pair of lugs projecting from frame members at opposite sides of said item toward said enclosure for engaging recesses formed in said enclosure.

21. A juvenile item as defined in claim 19 and further including a basket having one end pivotally supported by said undercarriage and its other pivotally suspended from frame members at opposite sides of said item so that when said frame members are folded down toward said undercarriage, said basket is swung down below said undercarriage to provide nesting space for said enclosure.

References Cited

UNITED STATES PATENTS

| | | | |
|---|---|---|---|
| 2,972,488 | 2/1961 | Alsop | 280—47.37 |
| 3,110,504 | 11/1963 | Myers | 280—36 |
| 3,206,247 | 9/1965 | Johnson | 297—254 |
| 3,222,081 | 12/1965 | Harmon | 280—36 |
| 3,223,431 | 12/1965 | Gottfried et al. | 280—47.38 |
| 3,248,125 | 4/1966 | Gill | 280—47.4 |
| 3,272,556 | 9/1966 | Rocker | 297—310 |
| 3,443,823 | 5/1969 | Perego | 280—36 |
| 3,463,504 | 8/1969 | Petry et al. | 280—31 |

BENJAMIN HERSH, Primary Examiner

L. J. PAPERNER, Assistant Examiner

U.S. Cl. X.R.

5—93; 280—36, 47.38; 297—254